United States Patent [19]

Hohman et al.

[11] 4,319,903

[45] Mar. 16, 1982

[54] METHOD AND APPARATUS FOR PREHEATING GLASS BATCH

[75] Inventors: Charles M. Hohman, Granville; Mark A. Propster, Gahanna; Stephen Seng, Bladensburg, all of Ohio

[73] Assignee: Owens-Corning Fiberglas Corporation, Toledo, Ohio

[21] Appl. No.: 181,589

[22] Filed: Aug. 27, 1980

[51] Int. Cl.³ .................. C03B 1/00; F28D 19/02
[52] U.S. Cl. ........................... 65/27; 65/134; 65/335; 165/1; 165/88
[58] Field of Search ............... 65/27, 335, 134; 165/1, 165/88

[56] References Cited

U.S. PATENT DOCUMENTS

| | | |
|---|---|---|
| 2,592,783 | 4/1952 | Aspegren . |
| 2,872,386 | 2/1959 | Aspegren . |
| 3,369,598 | 2/1968 | List . |
| 4,099,953 | 7/1978 | Rondeaux et al. ............ 65/27 X |
| 4,207,943 | 6/1980 | Gardner et al. . |

OTHER PUBLICATIONS

"Heat Transfer By Contact Between Agitated Particles" By A. N. Bozatelli, R. D. Haberstroh & J. M. Harper.

Primary Examiner—Arthur D. Kellogg
Attorney, Agent, or Firm—Ronald C. Hudgens; Patrick P. Pacella

[57] ABSTRACT

A process and apparatus for preheating glass batch ingredients is disclosed. The invention uses a heat exchange method that preferably employs furnace exhaust gases. The heated batch then is fed to a glass melting furnace.

19 Claims, 5 Drawing Figures

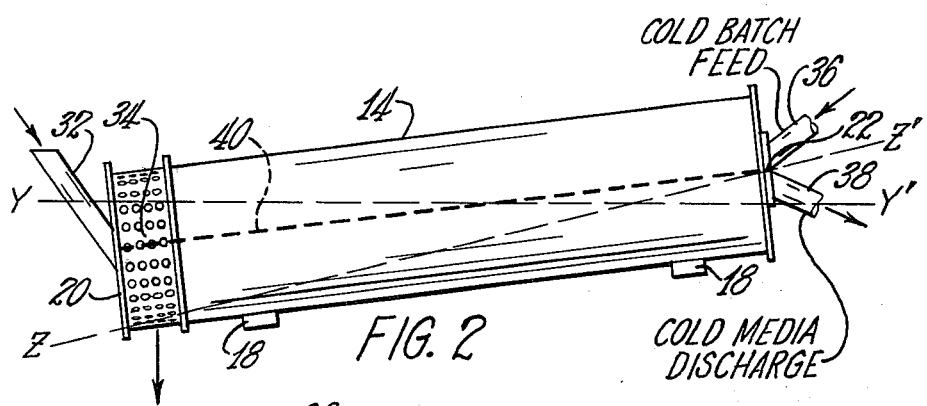
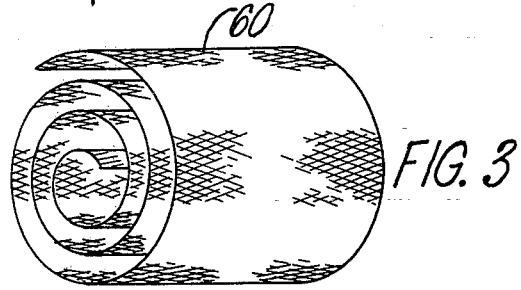
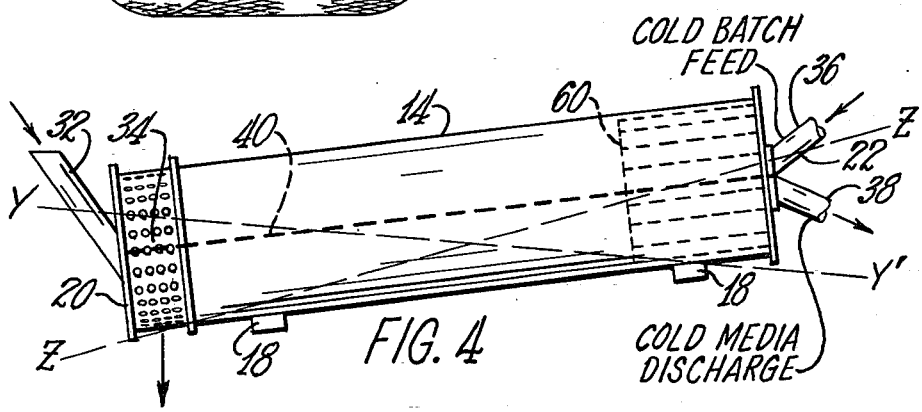
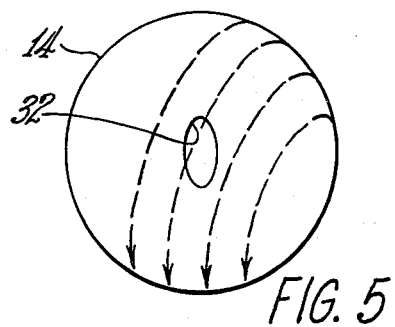

METHOD AND APPARATUS FOR PREHEATING GLASS BATCH

TECHNICAL FIELD

This invention relates to a process for preheating glass batch which then is fed to a glass melting furnace.

BACKGROUND ART

Methods are known in the art for glass manufacturing for preheating glass batch wherein glass-forming, batch ingredients are compacted into agglomerates and then are dried and heated in a chamber by a direct contact with flue gases from a glass melting furnace so as to produce free-flowing agglomerates which are then conveyed and discharged to the glass melting furnace. These agglomerates are composite, integral, self-supporting masses consisting essentially of all the substantial batch materials and may take the form of balls, extrusions, discs, briquettes, and pellets. The agglomerates are discharged to a vertical bed contained within a chamber and furnace flue gases pass, in direct contact with and countercurrently to, downwardly moving pellets of the bed to preheat them.

Particle-particle heat exchange between granular food products and spherical metal balls of different temperatures also are known in the art for heating the food products. The food products and metal balls are allowed to exchange heat in a rotating drum. This method allows the exchange of large quantities of heat economically and uniformly and without contamination from residues of the heat transfer medium.

DISCLOSURE OF INVENTION

I have developed a method and apparatus for preheating glass batch. My method employs particulate glass batch raw materials and media of larger particle size. In my method the glass batch moves in direct and immediate physical contact with the heated media in a container. Preferably, the media is spherical. The media can be heated with an external burner or preferably heated by direct contact with exhaust gases from a glass melting furnace.

BRIEF DESCRIPTION OF THE DRAWINGS

FIG. 2 illustrates the rotary drum heat exchanger in more detail.

FIG. 3 shows an expanded metal scroll which is used to remove media from the drum.

FIG. 4 shows the expanded metal scroll in place in the rotary drum heat exchanger.

FIG. 5 shows the tumbling profile within the drum.

BEST MODE OF CARRYING OUT INVENTION

Figure 1:
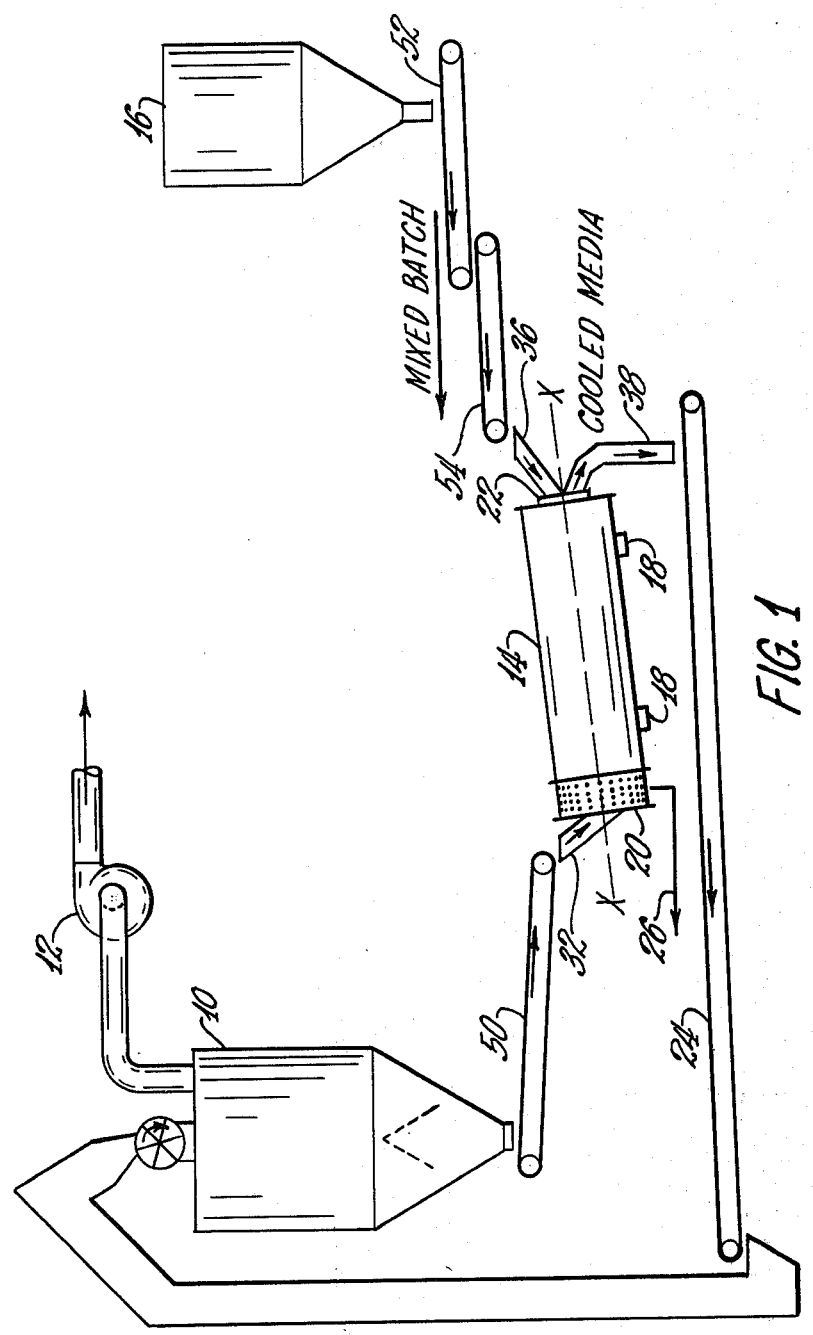
FIG. 1 is a flow diagram of this invention including a rotary drum heat exchanger.

My invention includes durable heat transfer media formed of glass batch agglomerates, glass, ceramic, steel, stainless steel, aluminum, gravel or the like which are positioned in a preheat hopper and preheated, preferably by exhaust gases from a glass making furnace.

The heated media is then introduced into one end of a container such as a cylindrical drum rotatable on an inclined axis. Concurrently, glass batch to be heated is introduced into the other end of the drum. The hot media flows in one general overall direction through the drum and the batch flows in a generally opposite direction through the drum. The media serves to heat the batch and the batch serves to cool the media. The cooled media is recycled back to the preheat hopper, the preheated batch is fed to the furnace batch feed mechanism.

In FIG. 1, heat transfer media may be heated with flue gases at a temperature normally ranging from 482° to 677° C. from a glass melting furnace (not shown) in preheat hopper 10. The flue gases are introduced into the lower part of preheat hopper 10 and the media is introduced into the upper part of preheat hopper 10. The flow of gases and media are countercurrent to each other. The media exits through the bottom of preheat hopper 10 and the flue gases exit through the top of preheat hopper 10. A blower or fan 12 is shown to pull the exhaust gases from preheat hopper 10 or to maintain a negative pressure in the hopper. The media may be heated to a temperature at or near the temperature of the flue gases.

The hot media then is fed to one end of heat exchange drum 14 by a conveyor 50. Concurrently, particulate glass batch raw materials are fed by conveyors 52 and 54 and a screw feeder (not shown) from mixed batch storage 16 to the other end of drum 14. Drum 14 is rotated around the axis x—x by a motor and drive (not shown).

Centrally arranged stationary end parts at 20 and 22 form inlet and outlet conduits communicating with the inside of the drum. After the cooled media is discharged from the drum, it is returned to preheat hopper 10 via conveyor 24. Hot mixed batch is fed to a glass melting furnace via stream 26.

FIG. 2 shows drum 14 in more detail. Hot media is fed to drum 14 through conduit 32 and hot batch is discharged through screen 34. Cold batch is fed through conduit 36 and cold media is discharged through conduit 38. The rotation of the drum and baffles 40 cause the media and batch to tumble in direct immediate physical contact with each other.

The cylindrical container is inclined at an angle. In the preferred embodiment, the batch charging end of the container is elevated above the media charging end. While the angle can vary widely, generally the drum will form an acute angle with a horizontal line no greater than about 45° and typically less than 15°. Preferably, the angle is less than 5°.

In order to bring the batch in direct contact with the hot media, an arrangement of baffles are attached to the interior of the container. Baffles 40 each are typically a series of baffles (3 or 4 in number) around the circumference of the drum. These baffles are 2 to 3 inches wide. These baffles usually are bolted to the walls of the drum and extend the length of the drum. All of the baffles in combination with the rotation of the drum, aid in tumbling the media and batch in direct contact with each other. Typically, cold batch is fed through conduit 36 into drum 14 with a screw feeder (not shown) that extends into the interior of the drum. This extension into the drum aids in reducing the amount of batch that may leave the drum with media through conduit 38. In one embodiment, hot media is fed through conduit 32 with a screw feeder (not shown) that extends into the interior of the drum.

While the tumbling of the media and batch occurs through agitation from the baffles and rotation of the drum, movement of the batch and media through the drum is believed to occur in the following manner. The media and batch form gradients in the drum and generally flow downhill in a direction along the gradients and in opposite directions. The batch and media tumble and move over each other as they flow from the high end to the low end of the pile of material in the container. FIG. 2 illustrates the flow of media and batch within the drum. The media flows in the general direction of axis Y—Y' from left to right and the batch flows in the general direction of axis Z—Z' from right to left.

FIG. 3 illustrates an embodiment for removing media from the drum. Expanded metal scroll 60 contains over 70% openings or voids. Hole size in scroll 60 is important as the holes must be big enough to allow batch to fall through. Typically, the holes are similar to a diamond in shape and are 1 inch by $\frac{3}{4}$ inch in size. As scroll 60 rotates, the media moves along a spiral path from the cylindrical wall region of the drum to the media exit, which is generally the midregion or center of the drum. The scroll is attached to the drum and rotates with the drum causing the media to move along a spiral path through the scroll to the center of the scroll. The batch, if any, falls through the voids of the scroll back into the interior of the drum without being discharged with the media. The screw feeder (not shown) usually extends past the scroll discharge so that batch will not be charged onto the scroll.

The size of scroll 60 can vary widely. The scroll employed with the 20"×100" drum 14 had a depth of 12". The inner curl had a radius of 4" with successive outer curls having a radius of 7" and 10", respectively.

The Y—Y' axis and the Z—Z' axis reflect the mass of media or batch respectively present at that point of the drum. As the media move from left to right in the drum, less media is present in the drum. More batch mass is present at the right end of the drum than at the left end. While each axis is drawn in static form, the batch and media are intermixed and tumbling in the drum. At the left end of the drum batch typically is mixed with the media. At the right end of the drum batch often covers the media. The Y—Y' axis in FIG. 2 generally extends from above conduit 32 to near the bottom of conduit 38. The Z—Z' axis in FIG. 2 usually extends from the bottom of conduit 36 to the bottom of screen 34.

FIG. 4 shows scroll 60 in place within drum 14. With the scroll in place, the Y—Y' axis usually extends to the bottom of scroll 60.

FIG. 5 is an end view of drum 14 showing various tumbling profiles of media within the drum. The profile will vary depending on the amount of material within the drum, speed of rotation and point within the drum. The profile may cover conduit 34 and media will still feed into the drum because of voids present in the mass of tumbling material within the drum. The tumbling profile generally is lower when the scroll is not present.

INDUSTRIAL APPLICABILITY

The rotary drum preheater uses a rotating drum with hot media and batch counter feeding from each end. On the media inlet end of the drum is a screen which screens out the hot batch. The media overflows the batch inlet end of the drum. A cold model was used to test the counter flow of batch and media. A 20"×100" drum was constructed. Batch was pulled at 600 lb/hr through this drum with a minimum dwell time of 2½ minutes and maximum dwell time of 7 minutes. At any given time, the drum contains about 60 pounds of batch. Other runs have been carried out where batch has been pulled through the drum at 1,000 lb/hr with 100 pounds hold up in the drum instead of 60 pounds.

The actual media evaluated were glass balls and batch pellets. Typically 500 pounds of glass balls are in the drum at any given time.

The cold model data for batch and media was determined as follows:

| Angle of Incline | Media % of Drum Volume | Batch % of Drum Volume | RPM |
| --- | --- | --- | --- |
| 0° | 20 | 8.7 | 30 |
| 2° | 22 | 9.3 | 30 |
| 4° | 39 | 16.7 | 30 |
| 6° | 49 | 21.0 | 30 |

Trials were conducted with both spherical and non-spherical agglomerates of varying sizes. It was determined through this testing that the media should be spherical in shape and closely matched in diameter to prevent batch and media flow problems. Preferably, the media will have a shape factor ranging between 0.9 and 1.0. The media, if closely matched, could have a wide diameter range, but the optimum size should be approximately one inch in diameter.

Hot trials have been carried out with media heated to 427° C. The media, in turn, heated the batch to a temperature of 388° C. for a heat transfer efficiency over 90%. With this invention, we expect to be able to heat glass batch to a temperature of 649° C. However, long range, the factors affecting this invention will be the melting temperature of the media and batch being heated.

Any glass batch can be preheated by this invention with bottle or container glass, flat glass and fiber glass batches being the most common.

The batch formulation used was a standard wool glass batch composition. Textile batch, however, also can be preheated by this invention.

A typical wool glass batch is:

| Ingredient | Weight Percent |
| --- | --- |
| Central Silica Sand | 40.96 |
| 5 Mol Borax | 10.77 |
| Burnt Dolomite | 4.68 |
| Soda Ash | 14.71 |
| Barytes | 3.02 |
| Nepheline Syenite | 11.85 |
| Spore Limestone | 7.94 |
| Carbon | 0.05 |
| Cullet | 6.00 |

The hot wool glass batch then can be fed to a glass melting furnace.

We claim:

1. A process for producing glass by charging to a melting furnace and melting therein a particulate glass batch, including the steps of:
    heating durable heat transfer media, larger in particle size than the glass batch, by direct contact with exhaust gases from the melting furnace;
    introducing the hot media into one end of an inclined container rotatable about an axis having the same inclination as the container;
    introducing the particulate glass batch into the other end of the container with the batch charging end of the container elevated above the media charging end;
    rotating the container, during rotation the batch and media tumbling and moving over each other in heat transfer relationship;

moving the glass batch in one direction through the rotating container towards the lower end for discharge and moving the hot media in the opposite direction for discharge at the elevated end; and discharging hot batch at the lower end of the container through openings that allow the batch to pass freely through but that prevent the media from passing.

2. A process for producing glass by charging to a melting furnace and melting therein a particulate glass batch, including the steps of:

heating durable heat transfer media, larger in particle size than the glass batch, by direct contact with exhaust gases from the melting furnace;

introducing the hot media into one end of an inclined container rotatable about an axis having the same inclination as the container;

introducing the articulate glass batch into the other end of the container with the batch charging end of the container elevated above the media charging end;

rotating the container, during rotation the batch and media tumbling and moving over each other in heat transfer relationship;

axially moving the glass batch in one direction through the rotating container towards the lower end for discharge and axially moving the hot media in the opposite direction for discharge at the elevated end; and discharging hot batch at the lower end of the container through openings that allow the batch to pass freely through but that prevent the media from passing.

3. A process according to claims 1 or 2 wherein the media and batch each form gradients and generally flow downhill in a direction along its gradient.

4. A process according to claims 1 or 2, wherein the hot media has a spherical shape.

5. A process according to claims 1 or 2 wherein the media is removed from the container by moving along a spiral path through a scroll connected to and located within the container, and communicating with a media exit to the exterior of the container.

6. A process according to claim 1 or 2 wherein the media is removed from the container by moving along a spiral path from an outer, interior region of the container to a centrally arranged media exit communicating to the exterior of the container.

7. An apparatus for preheating particulate glass batch comprising:

means for heating durable heat transfer media by direct contact with exhaust gases from a melting furnace;

a container rotatable about an axis, the axis being inclined to the horizontal;

means for introducing the hot media, larger in particle size than the glass batch, into the lower end of the container for movement towards the elevated end for discharge;

means for introducing particulate glass batch into the elevated end of the container for movement towards the lower end for discharge;

means for rotating the container along the inclined axis;

means associated with the interior of the container for tumbling and moving the particulate glass batch in direct contact with hot media during rotation of the container to heat the glass batch prior to charging to a melting furnace; and means for discharging hot batch at the lower end of the container having openings of a size that allows the batch to pass freely through the openings but that prevents the media from passing through the openings.

8. An apparatus according to claim 7 wherein the means for removing hot batch from the container is a grate-like member forming the sidewall of the container adjacent one end wall of the container, the openings of the member having a size that allows the batch to pass freely through the openings but that prevents the media from passing through the openings.

9. An apparatus according to claim 7 where the means for removing hot batch from the container is a screen or perforated plate.

10. An apparatus according to claim 7 wherein the container is a cylindrical drum.

11. An apparatus according to claim 7 wherein an arrangement of protruberances are attached to the interior of the container.

12. An apparatus according to claim 7 wherein the means for charging the batch extends into the interior of the container.

13. An apparatus according to claim 7 wherein the means for removing cooled media from the container includes a scroll attached to the container and extending into the container.

14. An apparatus according to claim 13 wherein the scroll has openings of a size that allows batch to pass freely through the openings but that prevents the media from passing through the openings.

15. An apparatus according to claim 14 wherein the scroll is at least 70 percent openings.

16. An apparatus according to claim 13 wherein the scroll is formed of screen, perforated plate or expanded metal.

17. An apparatus for preheating particulate glass batch comprising:

a rotatably mounted container;

an end wall defining an opening at each of the opposite ends of the container;

means for charging particulate glass batch to one of the openings in one end wall of the drum;

a vertical bed preheat hopper;

means for charging media to the hopper;

means for charging exhaust gases from a glass melting furnace to the hopper;

means for bringing the media in direct contact with the exhaust gases;

means for removing hot media from the hopper and charging the hot media to the opening in the other end wall of the container;

means for removing hot batch from the container; and means for removing cooled media from the container;

wherein the means for charging batch and the means for removing cooled media are at or adjacent one end of the container and the means for removing hot batch and the means for supplying hot media are at or adjacent the other end of the container;

wherein the means for removing cooled media from the container includes a scroll attached to the container and extending into the container; and wherein the scroll has openings of a size that allows batch to pass freely through the openings but that prevents the media from passing through the openings.

18. An apparatus according to claim 17 wherein the scroll is at least 70 percent openings.

19. An apparatus for preheating particulate glass batch comprising:
- a rotatably mounted container;
- an end wall defining an opening at each of the opposite ends of the container;
- means for charging particulate glass batch to one of the openings in one end wall of the container;
- means for charging hot media to the opening in the other end wall of the container;
- means for removing hot batch from the container; and
- means for removing cooled media from the container;
- wherein the means for charging batch and the means for removing cooled media are at or adjacent one end of the container and the means for removing hot batch and the means for charging hot media are at or near the other end of the container;
- wherein the means for removing cooled media from the container includes a scroll attached to the container and extending into the container; and
- wherein the scroll has openings of a size that allows batch to pass freely through the openings but that prevents the media from passing through the openings.

* * * * *